United States Patent [19]

Kurakake et al.

[11] Patent Number: 5,063,525
[45] Date of Patent: Nov. 5, 1991

[54] PICTURE PROCESSING APPARATUS INCLUDING DATA CONVERSION TABLE FOR PERFORMING CONVOLUTIONAL PROCESSING

[75] Inventors: Mitsuo Kurakake; Shoichi Otsuka, both of Hino; Yutaka Muraoka, Hachioji, all of Japan

[73] Assignee: Fanuc Ltd., Minamitsuru, Japan

[21] Appl. No.: 549,237

[22] Filed: Jul. 9, 1990

Related U.S. Application Data

[63] Continuation of Ser. No. 130,237, filed as PCT JP87/00336 on May 27, 1987, abandoned.

[30] Foreign Application Priority Data

May 27, 1986 [JP] Japan ........................... 61-121994

[51] Int. Cl.$^5$ ..................... G06F 15/66; G06K 9/54
[52] U.S. Cl. ..................... 395/157; 382/41; 382/42
[58] Field of Search ............. 364/518; 382/42, 41, 382/50; 358/448, 453

[56] References Cited

U.S. PATENT DOCUMENTS

| | | | |
|---|---|---|---|
| 4,156,914 | 5/1979 | Westell | 364/518 |
| 4,162,481 | 7/1979 | DuVall | 364/728 |
| 4,225,861 | 9/1980 | Langdon, Jr. et al. | 358/903 |
| 4,635,292 | 1/1987 | Mori et al. | 382/41 |
| 4,755,954 | 7/1988 | Netter | 364/518 |
| 4,823,281 | 4/1989 | Evangelisti et al. | 364/518 |
| 4,829,454 | 5/1989 | Kurakake et al. | 364/521 |
| 4,852,024 | 7/1989 | Kurakake et al. | 364/521 |

Primary Examiner—Gary V. Harkcom
Assistant Examiner—Raymond J. Bayerl
Attorney, Agent, or Firm—Staas & Halsey

[57] ABSTRACT

A picture processing apparatus inputs window data (W) to look-up tables (TBL) in which operators (G or F) to be applied to pixel data (x) are stored in correlation to the locations of the pixel data. By switching between the operators (G or F) contained in the look-up tables (TBL), window processing corresponding to a data address (i,j) is performed on input pixel data ($x_{ij}$).

8 Claims, 5 Drawing Sheets

PICTURE PROCESSING APPARATUS INCLUDING DATA CONVERSION TABLE FOR PERFORMING CONVOLUTIONAL PROCESSING

This is a continuation of co-pending application Ser. No. 07/130,237, filed as PCT JP87/00336 on May 27, 1987, now abandoned.

TECHNICAL FIELD

This invention relates to a picture processing apparatus for performing predetermined operations on items of pixel data for such purposes as extracting the characteristics of a picture.

BACKGROUND ART

It is known to make use of a look-up table (LUT), after a picture picked up by a camera or the like is digitized, in order to subject the digitized pixel data to such operations as binary coding, density conversion or picture reversal. If a look-up table LUT is used for a binary coding processing, for example, as shown in FIG. 5, $5\times 5$ items of pixel data $x_{ij}$ which exist prior to processing are binary coded by the look-up table LUT to be converted into $5\times 5$ items of binary coded pixel data $f(x_{ij})$ In the example shown in FIG. 5, the arrangement is such that a threshold value is set to "2", with data of a value equal to or less than "2" being converted to "0" and data of a value greater than "2" being converted to "1".

FIG. 6(a) illustrates the construction of a look-up table for processing $5\times 5$ items of pixel data. In FIG. 6(a), the look-up table LUT is composed of a table TBL$_0$ in which operators to be applied to the pixel data are stored upon being correlated with the individual items of pixel data $x_{ij}$, and an arithmetic section 20 for applying operators $f_{ij}$ outputted from the table TBL$_0$ to the corresponding items of pixel data $x_{ij}$. By way of example, five address lines $A_{00}$–$A_{04}$ are connected to the input of the table TBL$_0$, whereby a maximum of 32 table address spaces can be accessed.

FIG. 6(b) illustrates an example of the configuration of the memory within the look-up table LUT. Each address of the table TBL$_0$ corresponds to a location of an item of the $5\times 5$ pixel data $x_{ij}$, as will be understood from the memory configuration. More specifically, an item of pixel data $x_{00}$ shown in FIG. 5 corresponds to an address ADDR$_{00}$, and an address $x_{44}$ corresponds to an address ADDR$_{24}$. An operator $f_{00}$ to be applied to the pixel data $x_{00}$ is stored at the location of address ADDR$_{00}$ of the table TBL$_0$, an operator $f_{01}$ to be applied to the pixel data $x_{01}$ is stored at the location of address ADDR$_{01}$, and an operator $f_{44}$ to be applied to the pixel data $x_{44}$ is stored at the location of address ADDR$_{24}$. The table TBL$_0$ comprises a RAM. Accordingly, the operators $f_{ij}$ to be applied to the individual items of pixel data $x_{ij}$ are stored in a form capable of being altered. In FIG. 6(a), a chip select terminal cs of the table TBL$_0$ or RAM is held at zero potential, so that the table TBL$_0$ is being selected at all times.

Data lines $D_0$–$D_7$ for the pixel data $x_{ij}$ and the output of the table TBL$_0$ are applied to the arithmetic section 20. The data lines carry eight bits and are capable of expressing data indicative of 256 levels of tones. The arithmetic section 20 applies the operators $f_{ij}$ from the table TBL$_0$ to the pixel data $x_{ij}$, whereby results $f_{ij}(x_{ij})$ are obtained. With respect to the pixel data $x_{01}$, for example, the address ADDR$_{01}$ is addressed, the operator $f_{01}$ is outputted from the table TBL$_0$, and the operator $f_{01}$ is applied to the pixel data $x_{01}$ in the arithmetic section 20.

When such pixel data processing is performed, there are cases where it is desired to apply window processing, i.e. mask processing, to specific pixel data. FIG. 7 illustrates a conventional picture processing apparatus which executes window processing at the same time as pixel data processing. Window processing refers to processing in which the processing of pixel data $x_{ij}$ is masked and changed over by a window data value. This is performed by providing window data $W_{ij}$ correlated with the number of items of pixel data $x_{ij}$. When an item of window data $W_{ij}$ is "0", certain processing is applied to the item of pixel data $x_{ij}$ corresponding thereto (e.g. no processing whatsoever may be applied), and when the item of window data $W_{ij}$ is "1", processing different from that mentioned above is applied to the item of pixel data $x_{ij}$ corresponding thereto.

The picture processing apparatus mentioned above is provided with look-up tables LUT$_1$ and LUT$_2$ that differ from each other. The look-up tables execute separate processing operations with regard to all of the pixel data $x_{ij}$, input the results of processing $G_{ij}(x_{ij})$, $F_{ij}(x_{ij})$ to a window processing circuit 21, outputs $G_{ij}(x_{ij})$ as $P_{ij}(x_{ij})$ when the corresponding window data $W_{ij}$ is "0", and outputs $F_{ij}(x_{ij})$ as $P_{ij}(x_{ij})$ when the corresponding window data $W_{ij}$ is "1". In the example of FIG. 7, non-conversion operators $G_{ij}$ are stored in LUT$_1$, and the outputs $G_{ij}(x_{ij})$ of LUT$_1$ are output as $x_{ij}$. More specifically, as for the output $P_{ij}(x_{ij})$ of window processing circuit 21, the pixel data which prevailed prior to processing are output as is at addresses where the window data is "0", and pixel data which have been subjected to binary coding processing by LUT$_2$ are output at addresses where the window data is "1".

In this conventional apparatus, hard-wired logic shown in FIG. 8 is used as the window processing circuit 21 With this hard-wired logic, the outputs $G_{ij}(x_{ij})$ and $F_{ij}(x_{ij})$ of the look-up tables LUT$_1$ and LUT$_2$ are applied to one input terminal of the AND circuits 30 and 31, respectively, a signal obtained by inverting the window data $W_{ij}$ by means of an inverter 32 is applied to the other input terminal of the AND circuit 30, and the window data $W_{ij}$ is applied as is to the other input terminal of the AND circuit 31. Accordingly, the outputs $G_{ij}(x_{ij})$ and $F_{ij}(x_{ij})$ are gated by the window data $W_{ij}$. The outputs of the AND circuits 30 and 31 are applied to an OR circuit 33 to obtain the window-processed output $P_{ij}(x_{ij})$.

However, this hard-wired logic is required to be provided for each of the pixels of pixel data to be processed. In the example of FIG. 7, the hard-wired logic is required to be provided for each of 25 pixels. The logic therefore occupies a considerably large surface area of a printed circuit board and entails high cost. Furthermore, considerable time is needed for design, and design modification cannot be easily carried out.

The present invention has been devised to solve the foregoing problems and its object is to provide a picture processing apparatus which reduces hardware costs, enables the processing applied to data to be set very simply and has look-up tables which can be readily modified.

SUMMARY OF THE INVENTION

In accordance with the present invention, there is provided a picture processing apparatus characterized by comprising a plurality of look-up tables in which operators are arrayed, address input lines for inputting address data, which correspond to addresses of pixel data, to the look-up tables, window data lines for selecting the look-up tables by window data for the pixel data, and processing means for subjecting pixel data to predetermined processing by an operator from a designated address of a selected look-up table, whereby pixel data forming a picture are subjected to predetermined processing.

DESCRIPTION OF THE PREFERRED EMBODIMENT

An embodiment of the present invention will now be described in detail with reference to the drawings.

Figure 1:
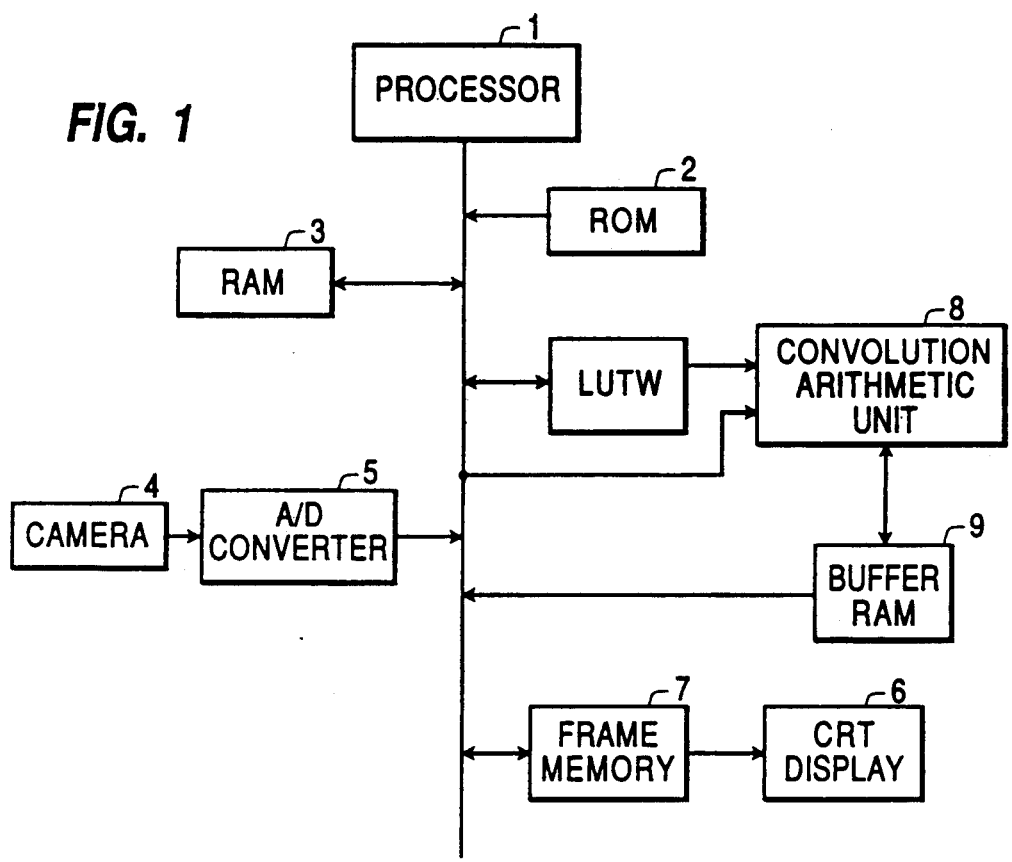
FIG. 1 is a block diagram illustrating an embodiment of a picture processing apparatus according to the present invention.

FIG. 1 is a block diagram of a picture processing apparatus. Connected to a processor 1 by a bus line are a ROM 2 storing a program for controlling the processor 1, a RAM 3 for storing the results of processing performed by the processor 1, or window data, and A/D converter 5 for converting analog picture data picked up by a camera 4 into digital picture data and for outputting the converted data, and a frame memory 7 for storing picture data displayed on a CRT display 6.

A look-up table LUTW similarly connected to the processor 1 is used to perform preprocessing of a picture before convolution processing is executed. The look-up table LUTW is composed of operators for example, a binary coding operation, noise removal, density conversion and the like. The results of processing using the look-up table LUTW are applied to a convolution arithmetic unit 8, and the results of processing performed by the latter are temporarily stored in a buffer RAM 9. The results of convolution processing from the buffer RAM 9 are stored in the frame memory 7 via the bus of the processor 1 and are displayed on the CRT display 6.

Figure 2:
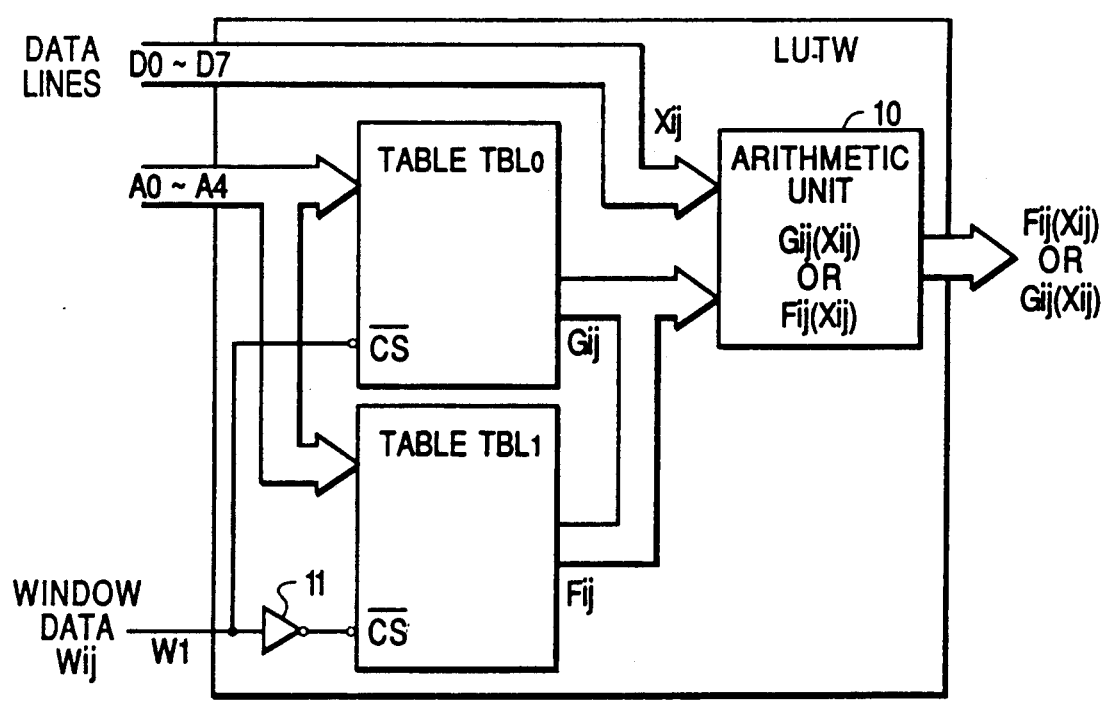
FIGS. 2 and 3 are block diagrams illustrating examples of look-up tables in the embodiment of FIG. 1.

FIG. 2 is a block diagram of the abovementioned look-up table LUTW.

The look-up table LUTW is equipped with two tables $TBL_0$ and $TBL_1$ storing operators for performing operations that differ from each other on one item of pixel data, and an arithmetic unit 10 which uses operators $G_{ij}$ and $F_{ij}$ of the tables $TBL_0$ and $TBL_1$ to operate on every item of pixel data $x_{ij}$. The pixel data $x_{ij}$ are input by data lines $D_0$–$D_7$. The addresses of the tables $TBL_0$ and $TBL_1$ correspond to the address locations of 5×5 items of pixel data $x_{ij}$ and are designated from address lines $A_0$–$A_4$. That is, a pixel $x_{00}$ corresponds to an address $ADDR_{00}$, a pixel $x_{01}$ corresponds to an address $ADDR_{01}$, and a pixel $x_{44}$ corresponds to an address $ADDR_{24}$. With this number of 5×5 pixels, the five address lines $A_0$–$A_4$ are adequate. However, in case of 256×254 pixels, for example, 16 address lines will be required.

Figure 3:
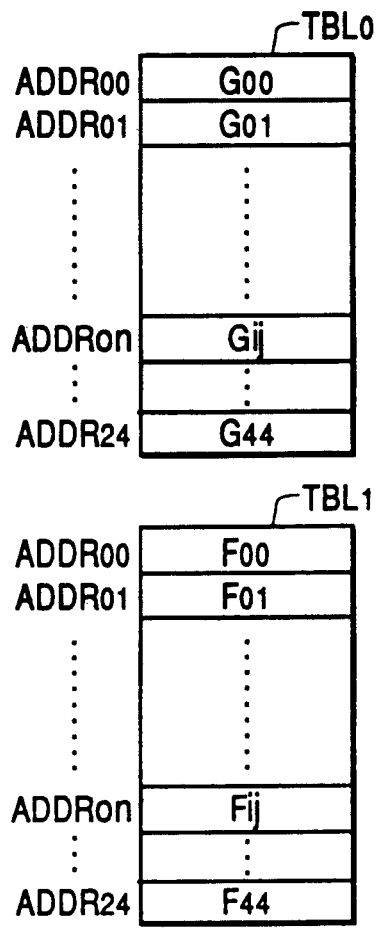

FIG. 3 is an example of the array of operators employed in the tables $TBL_0$ and $TBL_1$. Operators $G_{00}$ and $F_{00}$ to be applied to pixel data $x_{00}$ are stored at the address locations $ADDR_{00}$, operators $G_{01}$ and $F_{01}$ to be applied to pixel data $x_{01}$ are stored at the address locations $ADDR_{01}$ in the tables $TBL_0$ and $TBL_1$, and operators $G_{44}$ and $F_{44}$ to be applied to pixel data $x_{44}$ are stored at the address locations of $ADDR_{24}$ of the tables $TBL_0$ and $TBL_1$. In the example shown in FIG. 2, the tables $TBL_0$ and $TBL_1$ comprise two separate RAMs. One-bit window data $W_{ij}$ are applied to the chip select terminals cs of these RAMs directly or upon being inverted by an inverter 11. Accordingly, when the item of window data $W_{ij}$ is "0", only the table $TBL_0$ is selected and the pixel data $x_{ij}$ from the data lines $D_0$–$D_7$ is operated upon in the arithmetic unit 10 by the operator $G_{ij}$ from the table TBL0. When the item of window data $W_{ij}$ is "1", only the table $TBL_1$ is selected and the pixel data $x_{ij}$ from the data lines $D_0$–$D_7$ is operated upon in the arithmetic unit 10 by the operator $F_{ij}$ from the table $TBL_1$.

In the foregoing embodiment, the tables $TBL_0$ and $TBL_1$ are formed by separate RAMs and the window data $W_{ij}$ is supplied to the chip select terminals cs of the respective RAMs. However, a modification is possible in which the tables $TBL_0$ and $RBL_1$ are formed by a single RAM. In such case, the address lines to the RAM would be increased by one and the window data would be input by one address line $A_5$ among the six address lines $A_0$–$A_5$. This would make it possible to access addresses $ADDR_{00}$–$ADDR_{31}$ of the single RAM when the window data $W_{ij}$ is "0" and addresses $ADDR_{32}$–$ADDR_{63}$ when the window data $W_{ij}$ is "1". Accordingly, if the operators $G_{00}$, $G_{01}$, ..., $G_{44}$ are stored at the address locations $ADDR_{00}$, $ADDR_{01}$, ..., $ADDR_{23}$ of the RAM and the operators $F_{00}$, $F_{01}$, ..., $F_{44}$ are stored at the address locations ADDRhd 32, $ADDR_{33}$, ..., $ADDR_{51}$ of the RAM, then the operators can be selected by switching between the tables $TBL_0$ and $TBL_1$.

The operation of the picture processing apparatus having the construction shown in FIGS. 1 through 3 will now be described.

Assume that pixel data $x_{ij}$ to be processed have been stored in the frame memory 7. In accordance with the control program stored in the ROM 2, the processor 1 successively fetches the pixel data $x_{ij}$ from the frame memory 7 and inputs the data to the look-up table LUTW. On the other hand, the window data $W_{ij}$ for window processing are stored in the RAM 3. The processor 1 sends the window data $W_{ij}$ from the RAM 3 to the look-up table LUTW upon correlating the data with the pixel data $x_{ij}$ in frame memory 7.

Figure 4:
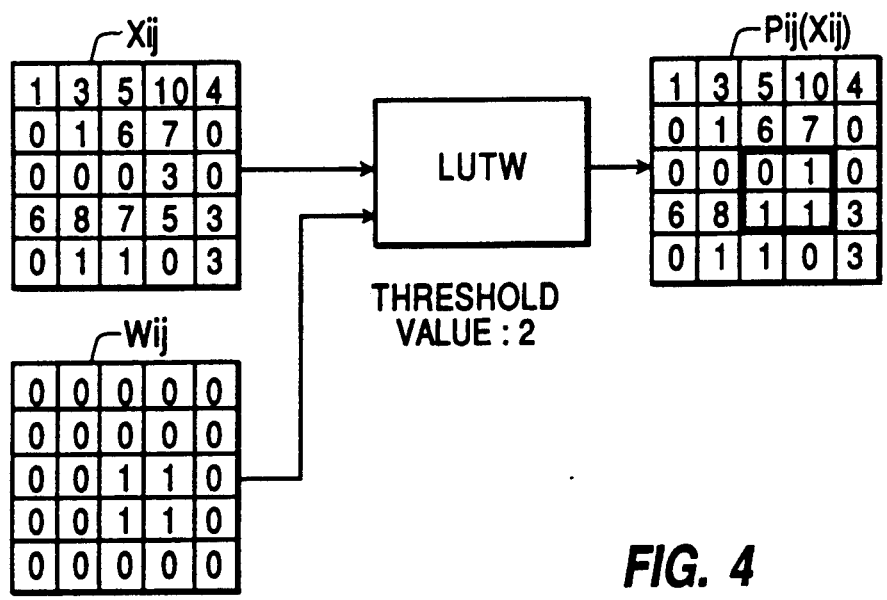
FIG. 4 is a look-up table according to the invention.
Figure 5:
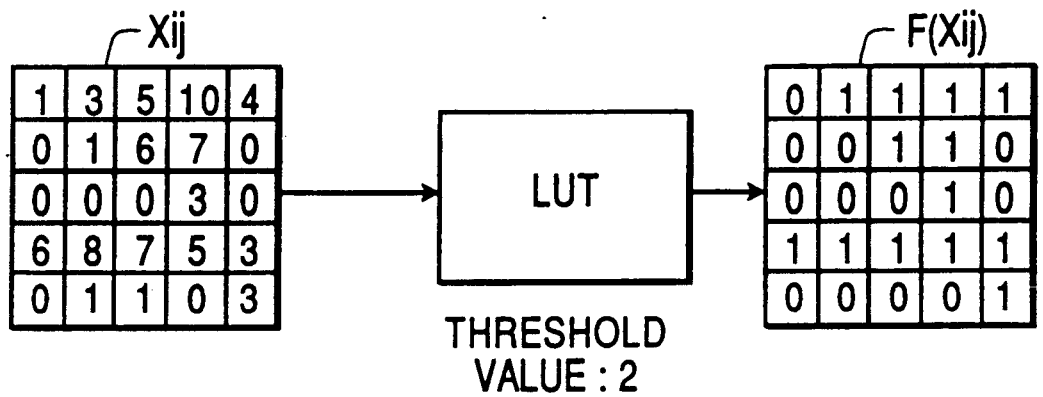
FIG. 5 is another look-up table.
Figure 8:
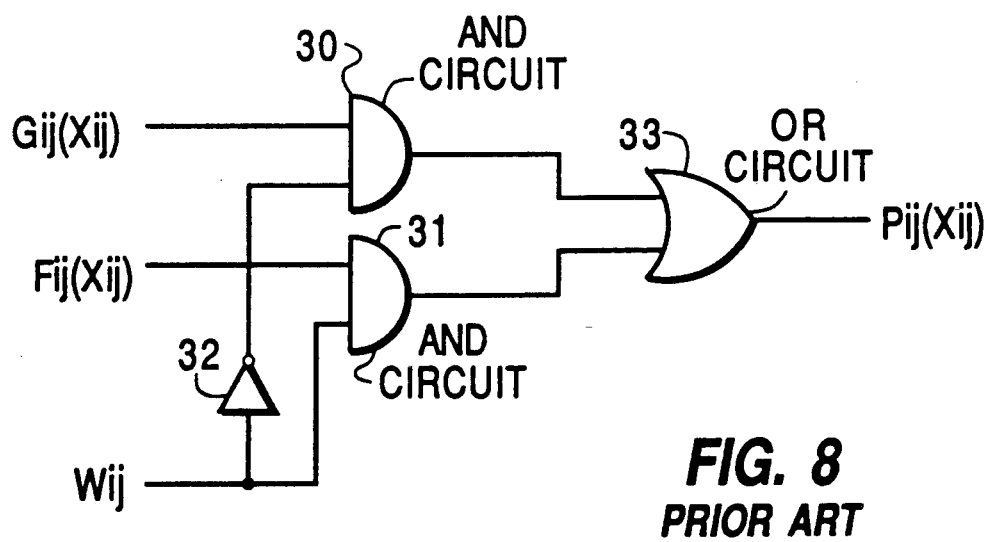
FIG. 8 is a circuit diagram of a conventional window processing circuit.
Figures 6A, 6B:
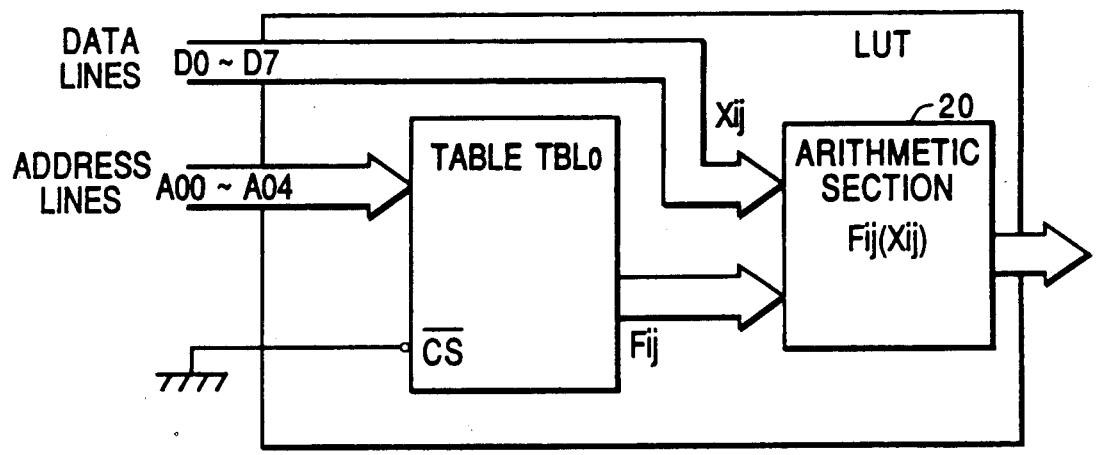
FIGS. 6(a) and (b) are block diagram sof a conventional look-up table.
Figure 7:
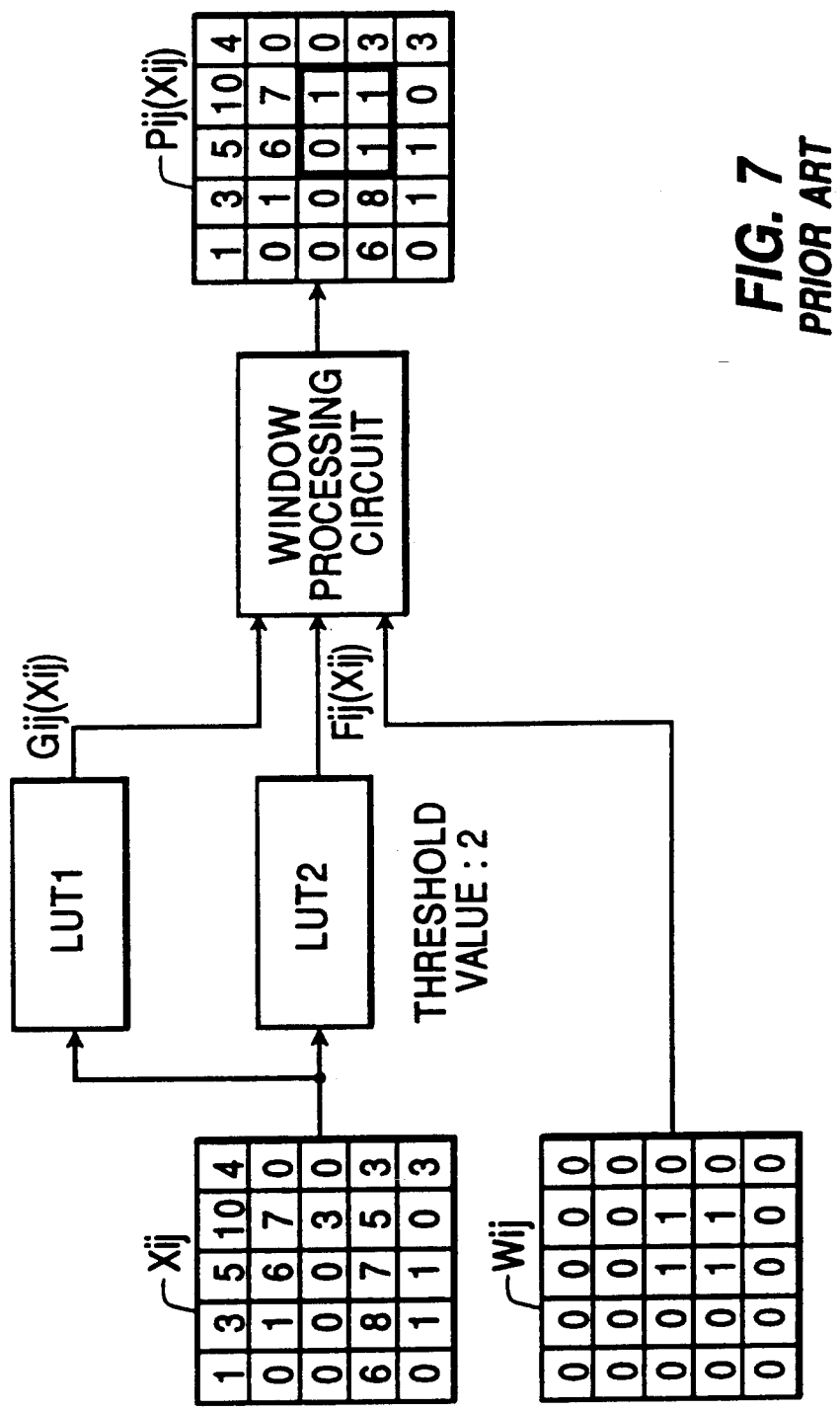
FIG. 7 is a conventional look-up table.

FIG. 4 illustrates an example of the form of processing actually performed by the look-up table LUTW. With regard to pixel data $x_{ij}$, for example, the look-up table LUTW in which the predetermined operators are arrayed delivers an output without conversion, that is, without executing any processing whatsoever, when the window data $W_{ij}$ is "0". When the window data $W_{ij}$ is "1", the look-up table LUTW delivers an output upon performing binary coding processing, the threshold value being "2". Since the window data $W_{ij}$ is supplied to the look-up table LUTW from the input side thereof in accordance with the invention, the hard-wired logic for window processing required in the conventional apparatus is unnecesary.

The results output by the look-up table LUTW are again stored in the frame memory 7. Next, the processor 1 shifts control from the look-up table LUTW to the convolution arithmetic unit 8. The convolution arithmetic unit 8 fetches the pixel data preprocessed and window data processed by the look-up table LUTW from the frame memory 7 and performs a convolution operation on these data. The results of convolution processing are accumulated in the buffer RAM 9. When all convolutions end, the results are again stored in the frame memory 7. Thus, a picture resulting from the preprocessing and window processing performed by the look-up table LUTW and the convolution processing performed by the convolution arithmetic unit 8 is displayed on the CRT display 6.

Though an embodiment of the present invention has been described, the invention is not limited thereto but can be modified in various ways without departing from the scope of the claims thereof.

In accordance with the picture processing apparatus of the present invention, the window data are input to the input side of the look-up table. In order to perform window processing, therefore, it is no longer required to provide hard-wired logic on the output side of the reference table. This makes it possible to lower the cost of the apparatus.

Furthermore, when the processing circuit is designed and modified, the contents of the RAMs can be prepared in advance or altered. As a result, the time required for designing the apparatus can be shortened and both design and modification are greatly facilitated.

We claim:

1. A picture processing apparatus including a data conversion table for performing convolutional processing for effecting data processing by selecting a particular operator from a plurality of operators for performing predetermined operations, such as digitization, density conversion, or image reversal, on pixel data forming a pciture which is stored in a frame memory, and for simultaneously effecting mask processing with window data, said picture processing apparatus comprising:

data lines for providing data;

a plurality of data conversion tables in which a plurality of operators corresponding to address positions of the pixel data are arrayed and stored;

address input lines, coupled to said data conversion tables, for inputting address data which correspond to addresses of pixel data output from the frame memory, to each of said data conversion tables;

window data lines, coupled to said data conversion tables, for window data for providing window data to first predetermined ones of said data conversion tables and inverted window data to second predetermined ones of said data conversion tables; and arithmetic means coupled to said plurality of data conversion tables and said data lines, for receiving the output data from said data conversion tables and the data from said data lines, and for processing and outputting the output data.

2. A picture processing apparatus according to claim 1, wherein said data conversion tables comprise a RAM.

3. A picture processing apparatus according to claim 2, wherein said data conversion tables are constructed on different RAM chips.

4. A picture processing apparatus according to claim 2, wherein said data conversion tables are constructed on the same RAM.

5. A picture processing apparatus according to claim 1, wherein the window data are stored in a RAM.

6. A picture processing apparatus according to claim 1, wherein preprocessing for a convolution operation is executed by the operators stored in said data conversion tables.

7. A picture processing apparatus according to claim 1, wherein said data conversion tables comprise RAMs each having a chip select terminal, the window data being input to the chip select terminal of predetermined ones of said RAMs.

8. A picture processing apparatus according to claim 1, wherein said data conversion tables comprise a single RAM.

* * * * *